United States Patent
Liao

(10) Patent No.: US 9,715,651 B1
(45) Date of Patent: Jul. 25, 2017

(54) ACTIVE RADIO FREQUENCY IDENTIFICATION DEVICE

(71) Applicant: WAYS TECHNICAL CO., LTD., Taoyuan (TW)

(72) Inventor: Shih-Wen Liao, Taoyuan (TW)

(73) Assignee: WAYS TECHNICAL CO., LTD., Taoyuan (TW)

(*) Notice: Subject to any disclaimer, the term of this patent is extended or adjusted under 35 U.S.C. 154(b) by 0 days.

(21) Appl. No.: 15/185,361

(22) Filed: Jun. 17, 2016

(30) Foreign Application Priority Data

May 17, 2016 (TW) .............................. 105207179 U

(51) Int. Cl.
*G06K 19/06* (2006.01)
*G06K 19/077* (2006.01)
*G06K 19/07* (2006.01)

(52) U.S. Cl.
CPC ... *G06K 19/07722* (2013.01); *G06K 19/0723* (2013.01); *G06K 19/0775* (2013.01); *G06K 19/07745* (2013.01); *G06K 19/07773* (2013.01)

(58) Field of Classification Search
CPC .................... G06K 19/07749; G06K 19/0775

USPC ................. 235/492, 462.46, 472.02
See application file for complete search history.

(56) References Cited

U.S. PATENT DOCUMENTS

| | | | | |
|---|---|---|---|---|
| 2007/0114621 | A1* | 5/2007 | Wisnudel | G09F 3/0291 257/414 |
| 2011/0180811 | A1* | 7/2011 | Suzuki | G06K 19/07745 257/77 |
| 2012/0056002 | A1* | 3/2012 | Ritamaki | G06K 19/07786 235/492 |
| 2016/0045144 | A1* | 2/2016 | Bansal | G01N 33/528 600/347 |

* cited by examiner

*Primary Examiner* — Daniel St. Cyr
(74) *Attorney, Agent, or Firm* — Jackson IPG PLLC; Demian K. Jackson

(57) ABSTRACT

An active RFID device includes at least one solar cell, and the solar cell includes: a substrate; a first conductive layer, disposed on the substrate; an electron supplying layer, disposed on the first conductive layer; an electron receiving layer, disposed on the electron supplying layer; and a second conductive layer, disposed on the electron receiving layer; and a RFID tag, including a RFID chip and an antenna, and installed on the substrate, and coupled to the solar cell through a telecommunication connection structure.

19 Claims, 5 Drawing Sheets

ACTIVE RADIO FREQUENCY IDENTIFICATION DEVICE

FIELD OF THE INVENTION

The present invention relates to radio frequency identification (RFID) devices, more particularly to an active RFID device combined with a solar cell.

BACKGROUND OF THE INVENTION

In recent years, non-contact identification devices for transmitting radio signals become increasingly popular, and these devices generally come with a main body and an external read/write device for exchanging information to achieve the effects of information transmission and identification. Radio Frequency Identification (RFID) tag is a new radio transmission device used extensively in many areas such as logistics management, merchandise management, medical management, etc. Due to the non-contact characteristic and the simple application, RFID systems have gradually replace traditional contact identification systems such as barcode scanning identification systems.

The so-called RFID tag generally includes a RFID chip and an antenna coupled to the RFID chip. Radio signals are transmitted from the RFID chip to an external read/write device through the antenna for transmitting and receiving data to achieve the identification effect.

The RFID tag is mainly divided into an active RFID tag and a passive RFID tag. For the active RFID tag, electric power can be supplied from an external power supply (such as a battery or a cell) to the RFID tag; and for the passive RFID tag, electric power of radio waves of the external read/write device is supplied to the RFID tag directly.

Since the RFID tag is thin, its application is convenient. The passive RFID tag is used mostly, but the passive RFID tag can just be used for signal transmissions within a short distance for a short time. If the distance of a read/write device is far from the RFID tag, then the signal transmission will become very weak. Therefore, the passive RFID tag always has the issue of insufficient transmission distance. Although the active RFID tag can be used as a device to substitute the passive RFID tag for long-distance signal transmissions, most power supply devices of the traditional active RFID tag are battery manufactured by old manufacturing processes, and thus the active RFID tag not just comes with a large volume only, but also consumes much power. Therefore, it is necessary to develop a RFID device capable of overcoming the transmission distance, volume, and power-saving issues concurrently.

SUMMARY OF THE INVENTION

In view of the problems of the prior art, it is a primary objective of this disclosure to provide an active RFID device combined with a solar cell and a RFID.

To achieve the aforementioned and other objectives, the present invention provides an active RFID device, comprising: at least one solar cell, including: a substrate; a first conductive layer, disposed on the substrate; an electron supplying layer, disposed on the first conductive layer; an electron receiving layer, disposed on the electron supplying layer; and a second conductive layer, disposed on the electron receiving layer; and a RFID tag, including a RFID chip and an antenna, and installed on the substrate, and coupled to the solar cell through a telecommunication connection structure.

Preferably, the solar cell further comprises a mixed electron supplying/receiving layer disposed between the electron supplying layer and the electron receiving layer.

Preferably, the active RFID device further comprises a bonding layer, disposed between the first conductive layer and the substrate, and disposed between the RFID tag and the substrate.

Preferably, the active RFID device further comprises a first protective layer disposed on the solar cell and the RFID tag.

Preferably, the active RFID device further comprises a second protective layer, disposed on another side of the substrate opposite to the side having the bonding layer.

Preferably, the first protective layer further comprises a notch disposed at a position corresponsive to the RFID tag.

Preferably, the active RFID device further comprises an encapsulation layer disposed between the bonding layer and the first protective layer, or disposed between the first protective layer and the second protective layer.

Preferably, the substrate is a hard or soft opaque substrate.

Preferably, the substrate is a hard or soft transparent substrate.

Preferably, the substrate is a translucent plastic substrate or a translucent glass substrate.

Preferably, the translucent plastic substrate is made of a material including but not limited to PET, PE, PMMA, PI, PA, PU or acrylic.

Preferably, the translucent plastic substrate has a thickness from 10 um to 500 um.

Preferably, the bonding layer is made of a material including but not limited to acrylic, epoxy resin, silicon, dioxide, or any combination of the above.

Preferably, the bonding layer has a thickness from 1 um to 5 um.

Preferably, the first conductive layer is partially etched to selectively form the conductive circuit.

Preferably, the first conductive layer is partially etched to selectively form the antenna.

Preferably, the first conductive layer is made of a material including but not limited to an organic material, an inorganic material, or a combination of the above.

Preferably, the organic material PEDOT, carbon nanotube, or a combination of the above.

Preferably, the inorganic material is a metal or a metallic oxide.

Preferably, the first conductive layer has a transmittance from 70% to 95%.

Preferably, the first conductive layer has a thickness from 100 nm to 10 um.

Preferably, the second conductive layer and the telecommunication connection structure are manufactured by screen printing a silver paste conductive coating.

Preferably, the second conductive layer and the telecommunication connection structure have a thickness from 1 um to 50 um.

Preferably, the first protective layer and the second protective layer are made of transparent plastic or glass and have a thickness from 50 um to 500 um.

DESCRIPTION OF THE PREFERRED EMBODIMENTS

The technical contents of this disclosure will become apparent with the detailed description of preferred embodiments accompanied with the illustration of related drawings as follows. It is intended that the embodiments and figures disclosed herein are to be considered illustrative rather than restrictive.

Figure 1:
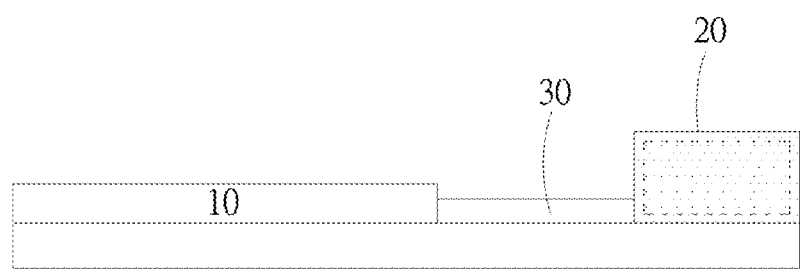
FIG. 1 is a first schematic view of an active RFID device in accordance with a first embodiment of the present invention.
Figure 2:
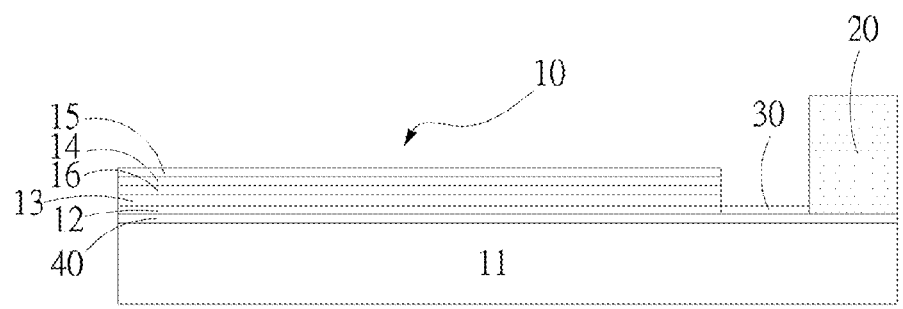
FIG. 2 is a second schematic view of an active RFID device in accordance with the first embodiment of the present invention.

With reference to FIGS. 1 and 2 for the first and second schematic views of an active RFID device in accordance with the first embodiment of the present invention respectively, the active RFID device is integrated with a RFID tag and a solar cell, and the solar cell is provided for supplying power to the RFID tag, so as to achieve the long-distance transmission, volume reduction and power saving effects. The active RFID device comprises a solar cell 10, a RFID tag 20, and a telecommunication connection structure 30, wherein the RFID tag 20 is coupled to the solar cell 10 through the telecommunication connection structure 30.

Specifically, the solar cell 10 comprises a substrate 11, a first conductive layer 12, an electron supplying layer 13, an electron receiving layer 14 and a second conductive layer 15, and further comprises a mixed electron supplying/receiving layer 16. The first conductive layer 12 is disposed on the substrate 11, and the electron supplying layer 13 is disposed on the first conductive layer 12, and the electron receiving layer 14 is disposed on the electron supplying layer 13, and the second conductive layer 15 is disposed on the electron receiving layer 14, and the mixed electron supplying/receiving layer 16 is disposed between the electron supplying layer 13 and the electron receiving layer 14, wherein the first conductive layer 12 is preferably installed on the substrate 11 through a bonding layer 40. The RFID tag 20 includes a RFID chip and an antenna, and the RFID tag 20 is installed onto the substrate 11 and coupled to the first conductive layer 12 of the solar cell 10 through the telecommunication connection structure 30, wherein the RFID tag 20 is preferably installed on the substrate 11 through the bonding layer 40. Preferably, the first conductive layer 12 is partially etched to selectively form the conductive circuit or the first conductive layer 12 is partially etched to selectively form the antenna.

In the description above, the substrate 11 is a hard or soft opaque substrate or a transparent substrate. If the substrate 11 is a transparent substrate, it may be a translucent plastic substrate or a translucent glass substrate and made of PET, PE, PMMA, PI, PA, PU or acrylic, and the thickness of the substrate 11 falls within a range from 10 um to 500 um, but the invention is not limited to such arrangement only. The first conductive layer 12 is made of an organic material, inorganic material, or a combination of the two. The organic material is PEDOT, carbon nanotube or a combination of the two, and the inorganic material is a metal or a metallic oxide, and the first conductive layer 12 has a transmittance from 70% to 95% and a thickness from 100 nm to 10 um, but the invention is not limited to such arrangements only. The second conductive layer 15 and the telecommunication connection structure 30 are manufactured by screen printing a silver paste conductive coating and have a thickness from 1 um to 50 um, but the invention is not limited to such arrangements only. The bonding layer 40 is made of acrylic, epoxy resin, silicon dioxide, or any combination of the above and has a thickness from 1 um to 5 um, but the invention is not limited to such arrangements only.

Figure 3:
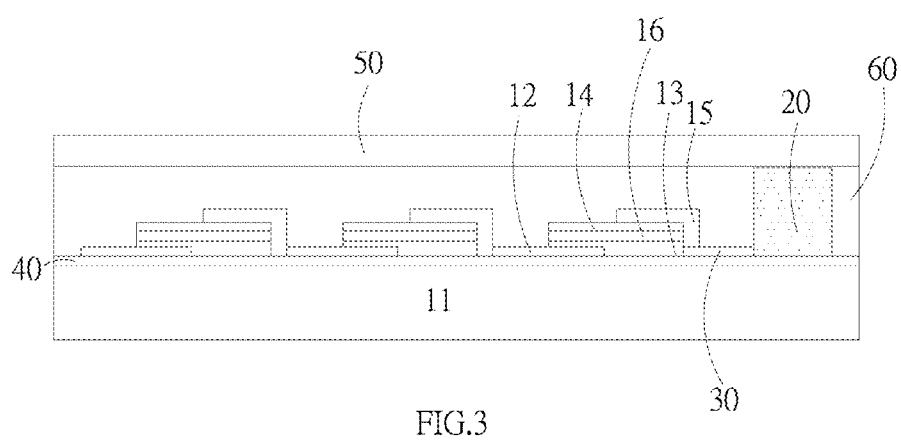
FIG. 3 is a schematic view of an active RFID device in accordance with a second embodiment of the present invention.
Figure 4:
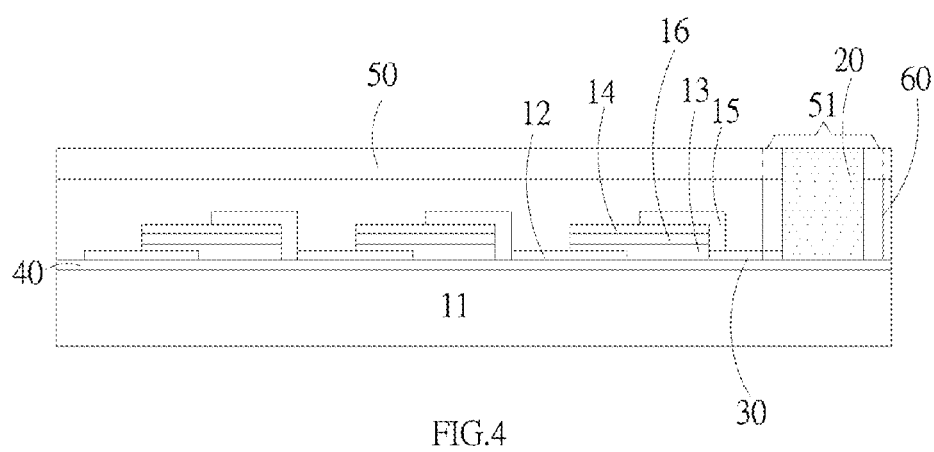
FIG. 4 is a schematic view of an active RFID device in accordance with a third embodiment of the present invention.
Figure 5:
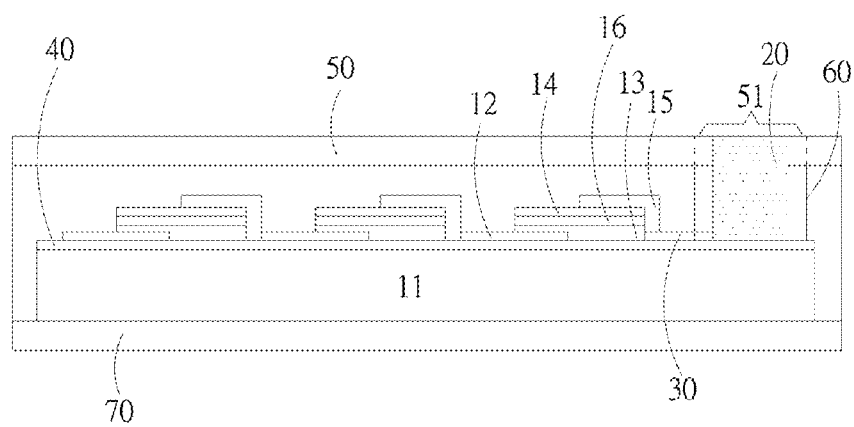
FIG. 5 is a schematic view of an active RFID device in accordance with a fourth embodiment of the present invention.

With reference to FIGS. 3 to 5 for the schematic views of the active RFID devices in accordance with the second, third and fourth embodiments respectively, there are plural solar cells 10 in the second embodiment, and the active RFID device of the second embodiment further comprises a first protective layer 50 and an encapsulation layer 60, and the first protective layer 50 is disposed on the solar cell 10 and the RFID tag 20, and the encapsulation layer 60 is disposed between the bonding layer 40 and the first protective layer 50 and provided for packaging the solar cell 10 and the RFID tag 20 between the bonding layer 40 and the first protective layer 50. Compared with the second embodiment, the first protective layer 50 of the third embodiment further has a notch 51 disposed at a position corresponsive to the RFID tag 20 and provided for accommodating the RFID tag 20. Compared with the third embodiment, the active RFID device of the fourth embodiment further comprises a second protective layer 70 disposed on another side of the substrate 11 and opposite to the bonding layer 40, and the encapsulation layer 60 is disposed between the first protective layer 50 and the second protective layer 70, so that the RFID tag 20 may be packaged between the first protective layer 50 and the second protective layer 70. Preferably, the first protective layer 50 and the second protective layer 70 are made of transparent plastic or glass and have a thickness from 50 um to 500 um, but the invention is not limited to such arrangements.

In summation of the description above, the active RFID device of the present invention is integrated with the RFID tag and the solar cell, and the solar cell manufactured by a miniaturization process further reduces the total volume of the active RFID device while providing the active signal transmission function and achieving long-distance signal transmissions for a long time. In addition, the solar cell is provided for converting light energy into electric energy which is supplied to the RFID tag to achieve the power-saving effect.

The present invention breaks through the prior art and definitely achieves the intended effects, and the invention is novel and is not apparent to or easily perceived by persons having ordinary skill in the art. In addition, the present invention is novel, inventive, useful, and in compliance with patent application requirements, and thus is duly filed for patent application.

While the ideas and technical characteristics of this disclosure have been described by means of specific embodiments, numerous modifications and variations could be made thereto by those skilled in the art without departing from the scope and spirit of this disclosure set forth in the claims.

What is claimed is:
1. An active RFID device, comprising:
at least one solar cell, including: a substrate; a first conductive layer, disposed on the substrate; an electron supplying layer, disposed on the first conductive layer; an electron receiving layer, disposed on the electron supplying layer; and a second conductive layer, disposed on the electron receiving layer; and a RFID tag, including a RFID chip and an antenna, and installed on the substrate, and coupled to the solar cell through a telecommunication connection structure, wherein the RFID tag further comprises a bonding layer disposed between the first conductive layer and the substrate, and disposed between the RFID tag and the substrate; the bonding layer is made of a material selected from the group consisting of acrylic, epoxy resin, and any combination thereof, wherein the substrate is a hard or soft transparent substrate, or a translucent plastic substrate or a translucent glass substrate; the translucent plastic substrate is made of a material selected from the group consisting of PET, PE, PMMA, PI, PA, PU and acrylic.

2. The active RFID device according to claim 1, wherein the solar cell further comprises a mixed electron supplying/receiving layer disposed between the electron supplying layer and the electron receiving layer.

3. The active RFID device according to claim 1, further comprising a first protective layer disposed on the solar cell and the RFID tag.

4. The active RFID device according to claim 3, further comprising a second protective layer disposed on another side of the substrate and opposite to the side having the bonding layer.

5. The active RFID device according to claim 4, further comprising an encapsulation layer disposed between the bonding layer and the first protective layer or disposed between the first protective layer and the second protective layer.

6. The active RFID device according to claim 4, wherein the first protective layer and the second protective layer are made of transparent plastic or glass and have a thickness from 50 um to 500 um.

7. The active RFID device according to claim 3, wherein the first protective layer further has a notch formed at a position corresponsive to the RFID tag.

8. The active RFID device according to claim 1, wherein the substrate is a hard or soft opaque substrate.

9. The active RFID device according to claim 1, wherein the translucent plastic substrate has a thickness from 10 um to 500 um.

10. The active RFID device according to claim 1, wherein the bonding layer has a thickness from 1 um to 5 um.

11. The active RFID device according to claim 1, wherein the first conductive layer is partially etched to selectively form the conductive circuit.

12. The active RFID device according to claim 1, wherein the first conductive layer is partially etched to selectively form the antenna.

13. The active RFID device according to claim 1, wherein the first conductive layer is made of a material selected from the group consisting of an organic material, an inorganic material, and a combination thereof.

14. The active RFID device according to claim 13, wherein the organic material is one selected from the group consisting of PEDOT, carbon nanotube, and a combination thereof.

15. The active RFID device according to claim 13, wherein the inorganic material is one selected from the group consisting of a metal and a metallic oxide.

16. The active RFID device according to claim 1, wherein the first conductive layer has a transmittance from 70% to 95%.

17. The active RFID device according to claim 1, wherein the first conductive layer has a thickness from 100 nm to 10 um.

18. The active RFID device according to claim 1, wherein the second conductive layer and the telecommunication connection structure are manufactured by screen printing a silver paste conductive coating.

19. The active RFID device according to claim 1, wherein the second conductive layer and the telecommunication connection structure have a thickness from 1 um to 50 um.

* * * * *